(12) United States Patent
Bogineni et al.

(10) Patent No.: US 11,522,960 B2
(45) Date of Patent: Dec. 6, 2022

(54) PROGRAMMABLE USER PLANE FUNCTION

(71) Applicant: Verizon Patent and Licensing Inc., Arlington, VA (US)

(72) Inventors: Kalyani Bogineni, Hillsborough, NJ (US); Hans Raj Nahata, New Providence, NJ (US); Ratul Kumar Guha, Kendall Park, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 93 days.

(21) Appl. No.: 16/695,434

(22) Filed: Nov. 26, 2019

(65) Prior Publication Data

US 2020/0099751 A1 Mar. 26, 2020

Related U.S. Application Data

(63) Continuation of application No. 15/963,904, filed on Apr. 26, 2018, now Pat. No. 10,511,669.

(51) Int. Cl.
| | |
|---|---|
| *H04L 67/14* | (2022.01) |
| *H04L 41/0803* | (2022.01) |
| *H04W 8/22* | (2009.01) |
| *H04W 76/11* | (2018.01) |
| *H04W 48/16* | (2009.01) |
| *H04W 28/02* | (2009.01) |

(52) U.S. Cl.
CPC .......... *H04L 67/14* (2013.01); *H04L 41/0803* (2013.01); *H04W 8/22* (2013.01); *H04W 48/16* (2013.01); *H04W 76/11* (2018.02); *H04W 28/02* (2013.01)

(58) Field of Classification Search
CPC ...... H04L 67/14; H04L 1/0803; H04W 76/11; H04W 8/22; H04W 48/16; H04W 28/02
See application file for complete search history.

(56) References Cited

U.S. PATENT DOCUMENTS

| | | | |
|---|---|---|---|
| 2010/0211675 A1* | 8/2010 | Ainali | ................. H04L 43/0888 709/224 |
| 2012/0214492 A1 | 8/2012 | Mihaly | |
| 2016/0337905 A1* | 11/2016 | Zhang | ..................... H04L 45/42 |

(Continued)

OTHER PUBLICATIONS

P4.org, "P416 Portable Switch Architecture (PSA)", https://p4.org/pr-spec/docs/PSA.html, Apr. 21, 2018, 58 pages.

(Continued)

*Primary Examiner* — Samina F Choudhry

(57) ABSTRACT

A device can receive, at a user plane function (UPF), a set of rules for managing a communications session. The set of rules can include a set of mobility management rules and a set of packet processing rules. The device can store the set of mobility management rules and the set of packet processing rules at the UPF. At a control plane of the UPF, the device can perform an analysis of a flow of one or more packets transmitted during the communications session. At run-time, and based on the analysis, the device can generate a modified set of packet processing rules from the stored set of packet processing rules. The device can receive a packet of the flow, apply the modified set of packet processing rules to the received packet, and forward the received packet and update the modified set of packet processing rules.

20 Claims, 7 Drawing Sheets

(56) References Cited

U.S. PATENT DOCUMENTS

| | | | | |
|---|---|---|---|---|
| 2017/0324652 A1* | 11/2017 | Lee | ............ | H04L 43/16 |
| 2018/0096752 A1* | 4/2018 | Ovalle | ............ | G07F 17/3223 |
| 2018/0192471 A1 | 7/2018 | Li | | |
| 2019/0104444 A1* | 4/2019 | Roeland | ............ | H04W 24/08 |
| 2019/0253917 A1* | 8/2019 | Dao | ............ | H04M 15/00 |
| 2019/0349810 A1* | 11/2019 | Cho | ............ | H04W 28/06 |

OTHER PUBLICATIONS

P4.org, "P416 Language Specification", https://p4.org/p4-spec/docs/P4-16-v1.0.0-spec.html, May 22, 2017, 107 pages.

Tech-invite, "NR—Overall description—Stage 2", http://www.tech-invite.com/3m38/tiny-3gpp-38-300.html, Mar. 2018, 5 pages.

3GPP Portal, "System Architecture for the 5G System", https://portal.3gpp.org/desktopmodules/Specifications/SpecificationDetails.aspx?specificationId=3144, 2017, 183 pages.

* cited by examiner

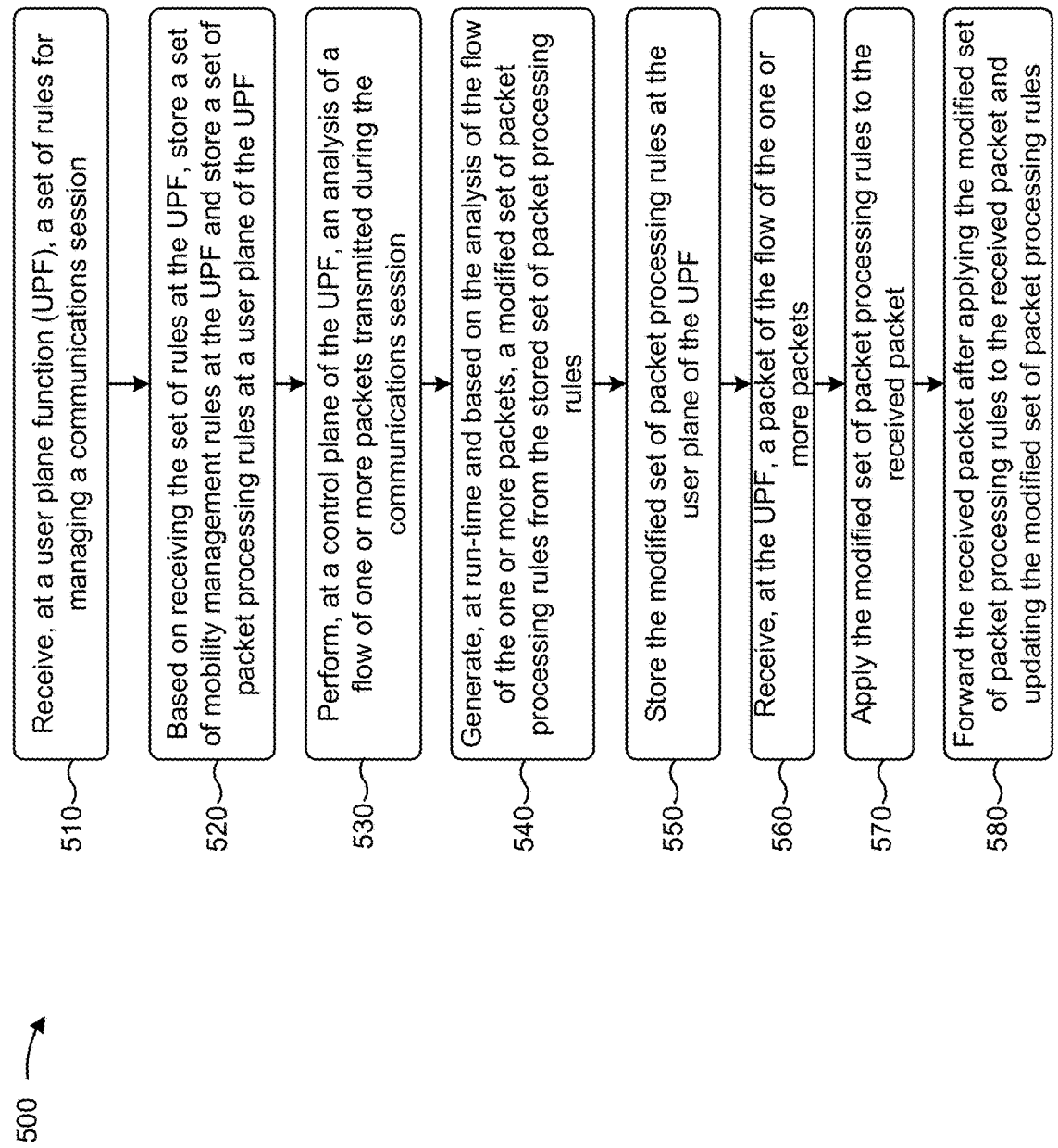

PROGRAMMABLE USER PLANE FUNCTION

RELATED APPLICATION

This application is a continuation of U.S. patent application Ser. No. 15/963,904, filed Apr. 26, 2018, the content of which is incorporated herein by reference.

BACKGROUND

5G/New Radio (5G/NR) provides various enhancements to wireless communications, such as slicing, flexible bandwidth allocation, improved spectral efficiency, ultra-reliable low-latency communications (URLLC), beamforming, high-frequency communication (e.g., millimeter wave (mm-Wave)), and/or the like.

BRIEF DESCRIPTION OF THE DRAWINGS

FIG. 5 is a flow chart of an example process for a programmable user plane function.

DETAILED DESCRIPTION OF PREFERRED EMBODIMENTS

Figure 1A:
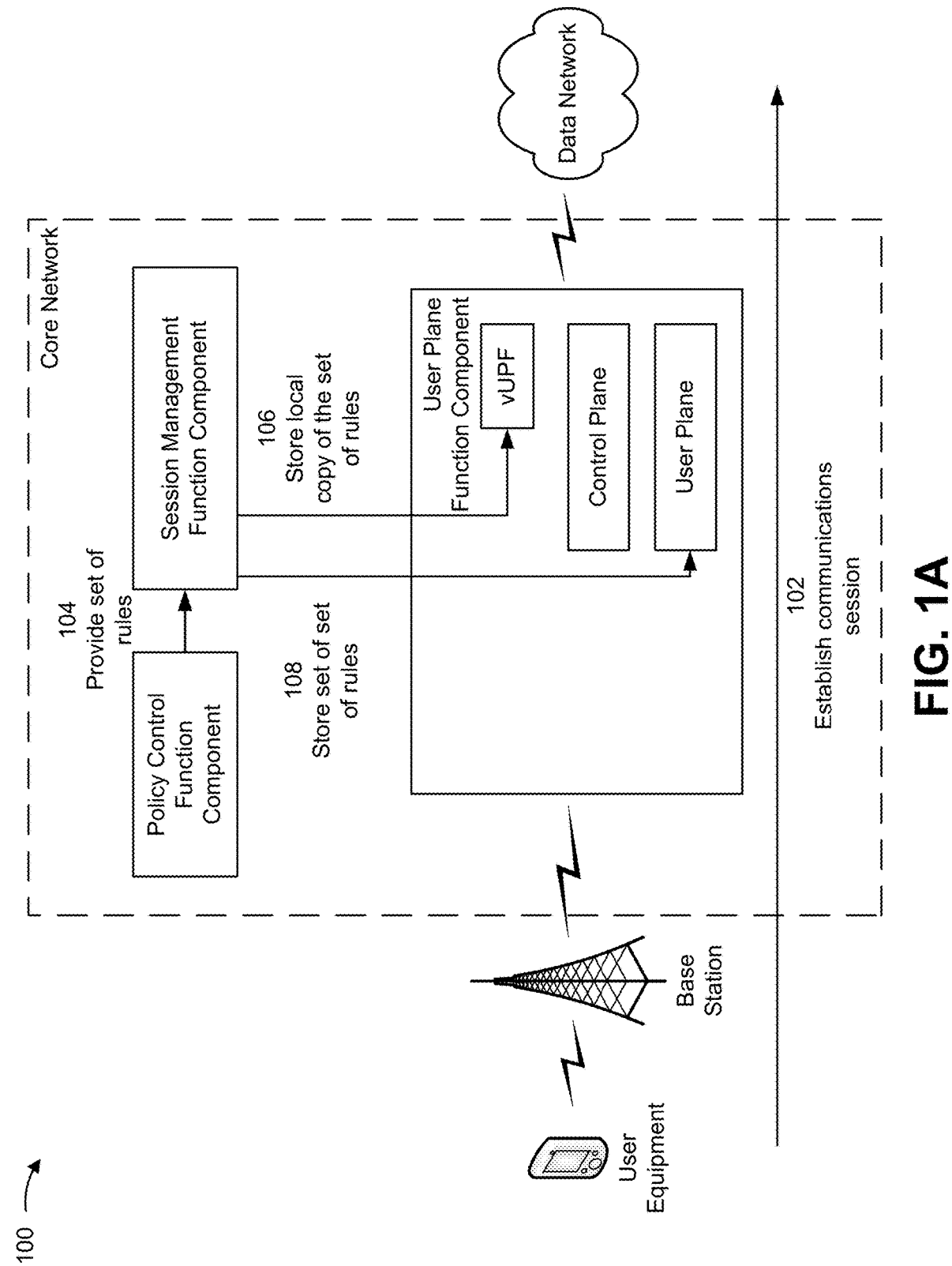
FIGS. 1A-1C are diagrams of an overview of an example implementation described herein.

The following detailed description of example implementations refers to the accompanying drawings. The same reference numbers in different drawings can identify the same or similar elements.

In a wireless telecommunications system, such as a 5G wireless telecommunications network, a user plane function (UPF) can process one or more packets by applying a set of rules to the one or more packets during a communications session. In some instances, the network operator can define the set of rules prior to setup of the communications session so that the rules can be applied to the one or more packets transmitted during the communications session in a static way. However, applying the set of rules in a static way can result in inefficient processing of some types of packets. Moreover, if the network operator wants to modify the set of rules, the network operator usually has to make the changes offline (i.e., after the communications session has ended and/or before another communications session is initiated) by incorporating the changes into a new software release and installing the new software release on devices of the wireless telecommunications network.

Some implementations, described herein, provide a wireless telecommunications system architecture capable of dynamically processing packets through the use of UPF programming. In some implementations, the wireless telecommunications system can include a core network that includes a UPF having a control plane and a user plane. The UPF can receive, at the UPF, a set of rules for managing a communications session. The received set of rules can include a set of mobility management rules and a set of packet processing rules. The set of mobility management rules can define, for example, how continuity of a communications session is to be maintained. The UPF can store the set of mobility management rules at the UPF and store the set of packet processing rules at the user plane. The set of packet processing rules can define, for example, the types of processing that is to be applied to packets transmitted during the communications session.

The UPF can perform, at the control plane of the UPF, an analysis of a flow of one or more packets transmitted during the communications session. The UPF can generate, at run-time and based on the analysis of the flow, a modified set of packet processing rules from the stored set of packet processing rules, and store the modified set of packet processing rules at the user plane. In this way, the UPF can receive, at the UPF, a packet of the flow of the one or more packets, apply the modified set of packet processing rules to the received packet, and forward the received packet after applying the modified set of packet processing rules to the received packet. This allows the network operator to make rule changes at run-time (e.g., at the start of a communications session, mid-session of a communications session, any time within a communications session, and/or the like) as opposed to making rule changes in a software update to the core network between communications sessions and/or during network maintenance. Moreover, making modifications at run-time allows the UPF to apply sets of packet processing rules tailored to specific types of packets, which can result in lower network latency, more efficient packet routing, increased network reliability, increased quality of service, faster encryption and decryption of packets, and the like.

Figure 1B:
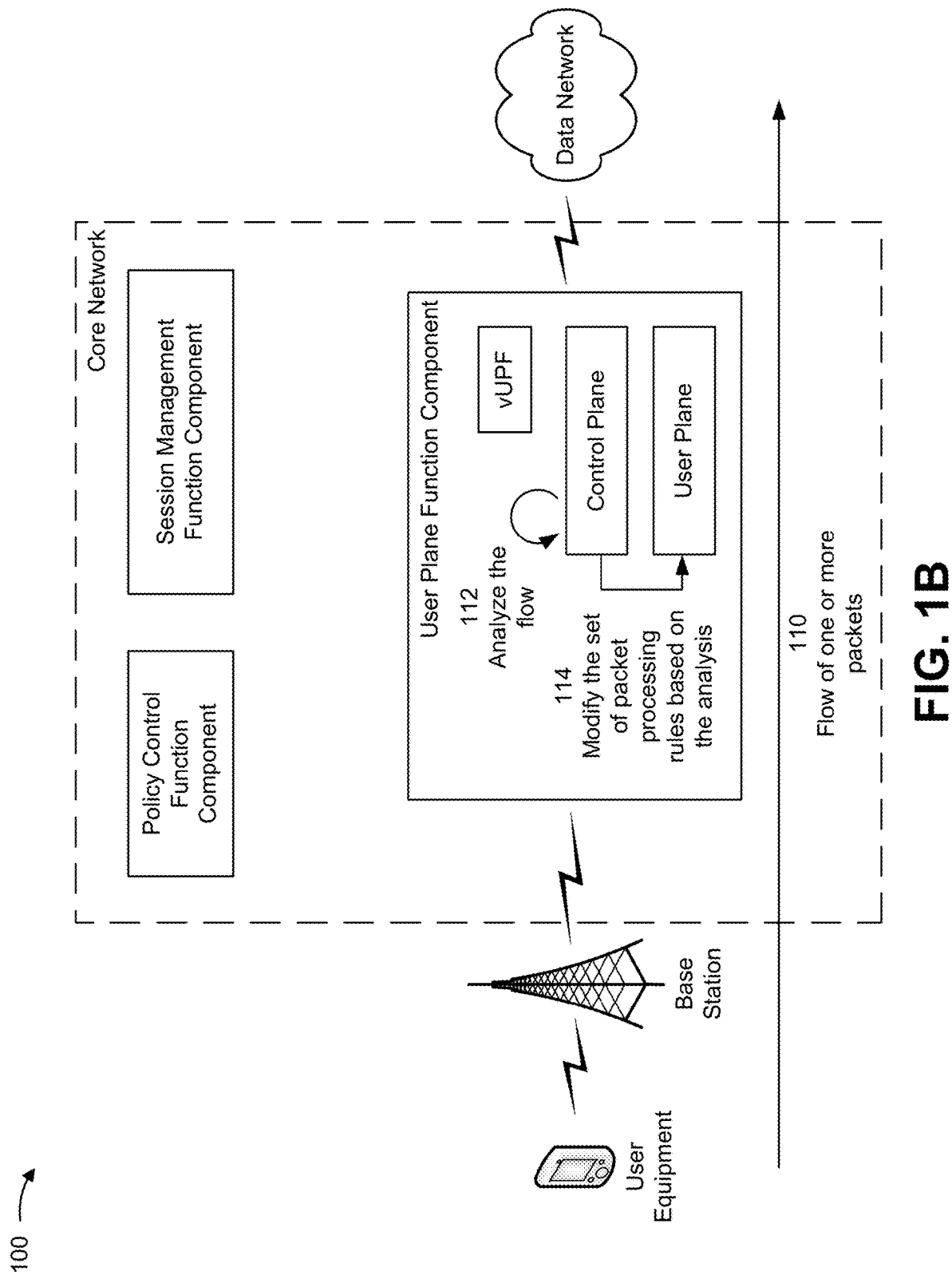
Figure 1C:
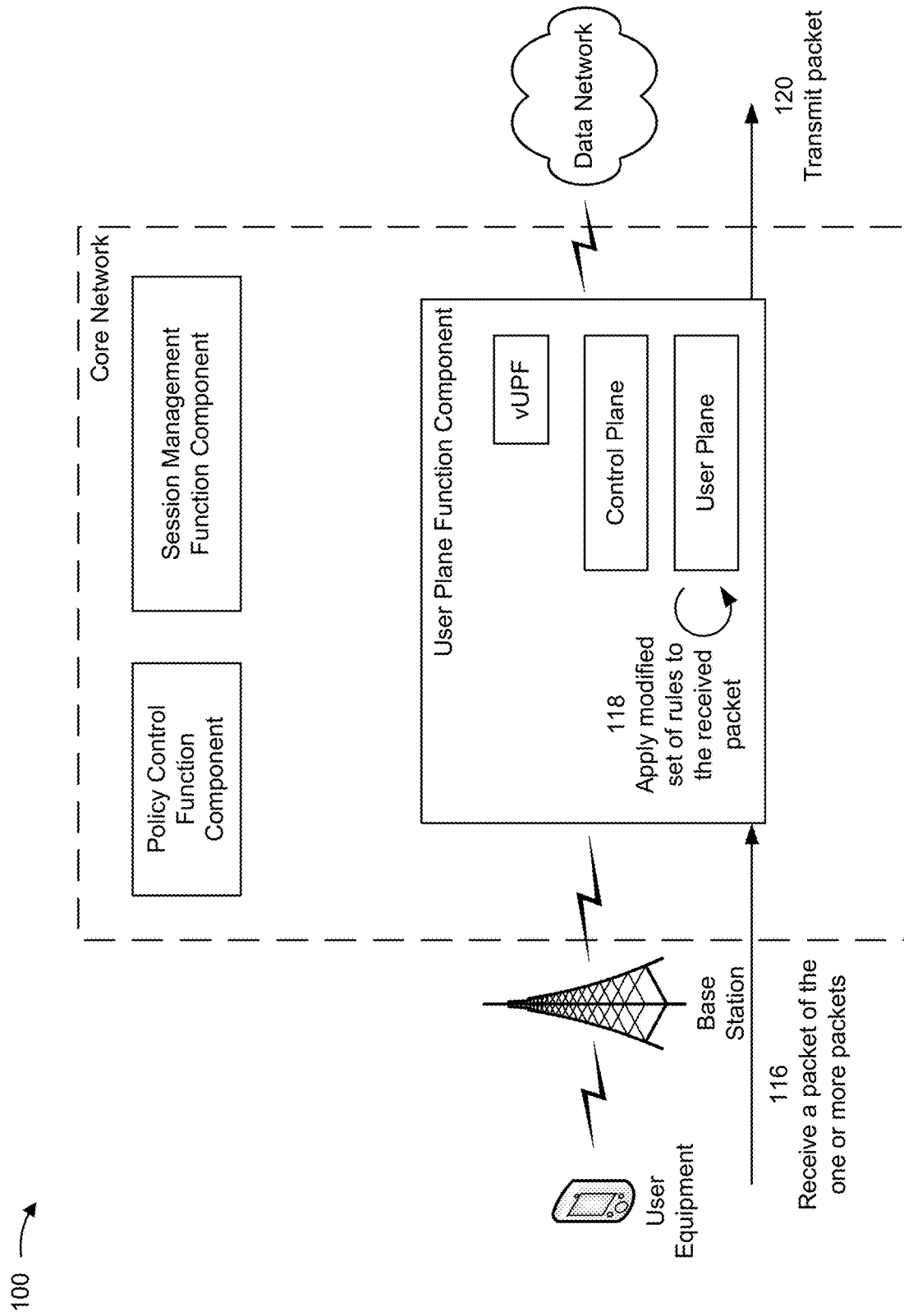

FIGS. 1A-1C are diagrams of an overview of an example implementation 100 described herein. Example implementation 100 illustrates various portions of a wireless telecommunications system, which in some implementations can be a 5G wireless telecommunications system. However, examples illustrated herein can be adapted for use in a 4G wireless telecommunications system, a long term evolution (LTE) wireless telecommunications system (e.g., a Packet Gateway (P-GW) and/or the like), a LTE-Advanced (LTE-A) wireless telecommunications system, and/or the like.

As shown in FIGS. 1A-1C, example implementation 100 can include a user equipment (UE) wirelessly connected to a base station, which is connected to a data network via a core network. The UE can include various devices, such as a mobile phone, a smartphone, a tablet, a computer, an Internet of things (IoT) device, or another other type of device capable of wireless communications.

The base station can include various types of base stations, such as a 5G next generation NodeB (gNodeB or gNB), a LTE evolved NodeB (eNodeB or eNB), and/or the like. In some implementations, the base station can be incorporated into a radio access network (RAN) of the wireless telecommunications system.

The core network can include various types of telecommunications core networks, such as a 5G next generation core network (NG Core), a LTE evolved packet core (EPC), and/or the like. In some implementations, the core network can include a policy control function (PCF) component, a session management function (SMF) component, and a user plane function (UPF) component, as well as other components and functions. The PCF component can store a set of rules defined by a network operator of the wireless telecommunications network. The set of rules can be used by the UPF component to process packets transmitted through the wireless telecommunications system. The SMF component can establish, modify, and/or release communications sessions in the wireless telecommunications system.

The UPF component can include a control plane, a user plane, and a virtual user plane function (vUPF), as well as other elements. As described above, the control plane can modify a set of packet processing rules stored in the user plane and store the modified set of packet processing rules in the user plane. As described above, the user plane can apply packet processing rules to packets transmitted through the wireless telecommunications system. The vUPF can be a virtualized software container (e.g., a Docker container or another type of software container) that is isolated from the other elements of the UPF. As stated above, the UPF component can apply rules to process packets transmitted through the wireless telecommunications system.

The data network can include various types of data networks, such as the Internet, a third party services network, an operator services network, a private network, a wide area network, and/or the like.

Turning now to FIG. 1A, assume that the UE is instructed to communicate over the wireless telecommunications system. In this case, and as shown by reference number 102, the UE can request the establishment of a communications session. For example, the UE can be instructed to communicate with an applications server communicatively connected to the data network. To do so, the UE can send a request to the core network to establish a communications session between the UE and the application server. Based on receiving the request, the SMF component can set up a communications session between the UE and the applications server.

At reference number 104, as part of setting up the communications session, the SMF component can obtain a set of rules from the PCF component, and provide the set of rules to the UPF component. The UPF component can receive the set of rules and use the set of rules to manage the communications session. The received set of rules can include a set of mobility management rules and a set of packet processing rules. The set of mobility management rules can include a service continuity rule (e.g., a rule that controls how packets are handled when an internet protocol (IP) address and/or an anchoring point changes during a communications session), a session continuity rule (e.g., a rule that controls how communications sessions are maintained as participants in the communications session geographically move throughout the wireless telecommunications system), and/or the like. The set of packet processing rules can include rules, such as a forwarding action rule (e.g., a rule that controls how a packet is forwarded), a usage reporting rule (e.g., a rule that collects statistics regarding packets forwarded for the communications session), a packet detection rule (e.g., a rule that controls how packets are detected or processed), a quality of service (QoS) enforcement rule (e.g., a rule that controls how a packet is processed or prioritized), and/or the like.

As shown by reference number 106, the UPF component can store the set of mobility management rules in the vUPF. In this way, the set of mobility management rules can be stored in the vUPF so that the set of mobility management rules can remain static and unmodified. This ensures that the set of mobility management rules can be applied during the communications session in a consistent manner.

As shown by reference number 108, the UPF component can also store the set of packet processing rules in the user plane. The control plane and the user plane of the UPF component can be included in a programmable space of the UPF component. This allows the control plane and the user plane of the UPF to be programmed via a programming language, such as a programming language for packet forwarding applications (e.g., the P4 programming language and/or the like). The control plane can be programmed to perform various functions, such as analyzing a flow of one or more packets transmitted during the communications session, modifying the set of packet processing rules stored in the user plane, and/or the like. The user plane can be programmed by the control plane. That is, the control plane can program the user plane to apply the modified set of packet processing rules to packets transmitted during the communications session.

As shown in FIG. 1B, and by reference number 110, once the communications session is set up, and the set of mobility management rules and the set of packet processing rules have each been stored, the UE can transmit a flow of one or more packets through the wireless telecommunications system during the communications session. A "flow" can be defined as one or more packets transmitted between a particular source and a particular designation during a communications session. For example, the communications session can include a connection between the UE and an application server. The UE and the application server each can be assigned a respective IP address. If the UE transmits one or more packets to the application server during the communications session, the transmission of the one or more packets to the application server during the communications session can be considered a flow. Moreover, if the application server transmits one or more packets to the UE during the communications session, the transmission of the one or more packets to the UE during the communications session can be considered another flow. In some implementations, packets transmitted in either direction between the UE and the application server during a communications (i.e., packets transmitted from the UE to the applications server and packets transmitted from the application server to the UE) can be considered a flow.

As shown by reference number 112, the control plane of the UPF component can be programmed to analyze the flow of the one or more packets transmitted during the communications session. In some implementations, the control plane can analyze the flow of the one or more packets by analyzing one or more properties associated with the flow. The one or more properties associated with the flow can include a source IP address, a destination IP address, a source port identifier, a destination port identifier, a protocol identifier, a flow type (e.g., a flow of one or more voice packets, a flow of one or more application packets, and/or the like), a type of application, a type of service, a type of application programming interface (API), and/or the like. Continuing with the example above involving the UE and the application server, the flow of the one or more packets being transmitted by the UE to the application server can have a source IP address corresponding to the UE's IP address, a destination IP address corresponding to the application server's IP address, a source port identifier corresponding to a source port for the flow, a destination port identifier corresponding to a destination port for the flow, a protocol identifier corresponding to a protocol used for communication of the flow, an application flow type (e.g., if the flow is associated with an application), a video streaming application type (e.g., if the one or more packets in the flow are associated with a video streaming application), and/or the like.

The control plane can use various analysis techniques to analyze the one or more properties, such as header inspection (e.g., reading headers of the one or more packets in the flow to determine a source IP address, a destination IP address, a source port identifier, a destination port identifier, a protocol identifier, and/or the like, associated with the flow), deep packet inspection (e.g., analyzing the data being transmitted in the one or more packets of the flow to determine an application type), string matching (e.g., identifying patterns in a portion of the one or more packets in the flow to identify properties of the overall flow), and/or the like.

As shown by reference number 114, based on the analysis of the flow of the one or more packets, the control plane can modify the set of packet processing rules stored in the user plane and store the modified set of packet processing rules in the user plane. In some implementations, the control plane can modify the stored set of packet processing rules by changing one or more rules in the stored set of packet processing rules, adding a new rule to the stored set of packet processing rules, eliminating (e.g., deleting, erasing, and/or the like) rules from the stored set of packet processing rules, and/or the like. For example, the stored set of packet processing rules can include a QoS enforcement rule, and the control plane can be modify the QoS enforcement rule based on a type of application associated with the flow. As an example, the control plane can modify the QoS enforcement rule such that different QoS classes are applied to different types of applications, such that a QoS class for a type of application is changed from a first QoS class to a second QoS class, and/or the like.

As shown in FIG. 1C, and by reference number 116, with the modified set of packet processing rules stored in the user plane, the UPF component can receive a packet of the flow of the one or more packets transmitted by the UE during the communications session. The packet may be transmitted by the UE, through the base station, and to the UPF component in the core network.

As shown by reference number 118, the UPF component can apply the modified set of packet processing rules to the received packet. In some implementations, the UPF component can also apply the set of mobility management rules, stored in the vUPF, to the received packet.

In some implementations, the UPF component can apply the modified set of packet processing rules to the received packet by adding information to a header of the received packet, removing information from the header of the received packet, changing information in the header of the received packet, and/or the like. When applied to the received packet, the modified set of packet processing rules can define routing or forwarding of the received packet (e.g., define the route that the received packet takes to get to a destination of the received packet), QoS handling of the received packet (e.g., define a QoS class for the packet, which can define the received packet's priority for network resources over other packets transmitted in the wireless communications system, define the received packet's priority for queueing or scheduling, and/or the like), packet inspection of the received packet (e.g., define whether shallow packet inspection applies to the received packet, whether deep packet inspection applies to the received packet, and/or the like), packet marking of the received packet (e.g., define how the received packet is marked, whether the received packet is to be marked for IP traceback purposes, and/or the like), a modification to the packet marking of the received packet, a modification to a header of the received packet, packet buffering of the received packet (e.g., define whether and where the received packet is to be held in a buffer in various portions of the wireless telecommunications system), redirection of the received packet (e.g., whether the received packet is to be redirected to another destination), traffic steering of the received packet (e.g., define a set of downstream service functions the received packet is to be steered through, such as network security functions, parental control functions, traffic optimization functions, and/or the like), traffic usage reporting associated with the received packet (e.g., define whether the received packet is to be taken into account when tracking bandwidth usage for a sender and/or receiver), and/or the like.

As shown by reference number 120, the UPF component can forward the received packet, after applying the modified set of packet processing rules to the received packet, to the data network and/or other locations within the wireless communications system. In this way, the received packet can be routed, inspected, processed, and/or the like, by other entities in the wireless telecommunications network according to the modified set of packet processing rules applied to the received packet. In some implementations, the UPF component can update the modified set of packet processing rules. For example, the UPF component can update the modified set of packet processing rules based on QoS enforcement rules.

In this way, the UPF component can modify and apply a set of rules at run-time as opposed to making the modifications offline and implementing them in a software update to the core network. This improves performance of the wireless communications system by allowing the UPF component to apply rules to packets in an optimized way.

As indicated above, FIGS. 1A-1C are provided merely as examples. Other examples are possible and can differ from what was described with regard to FIG. 1.

Figure 2:
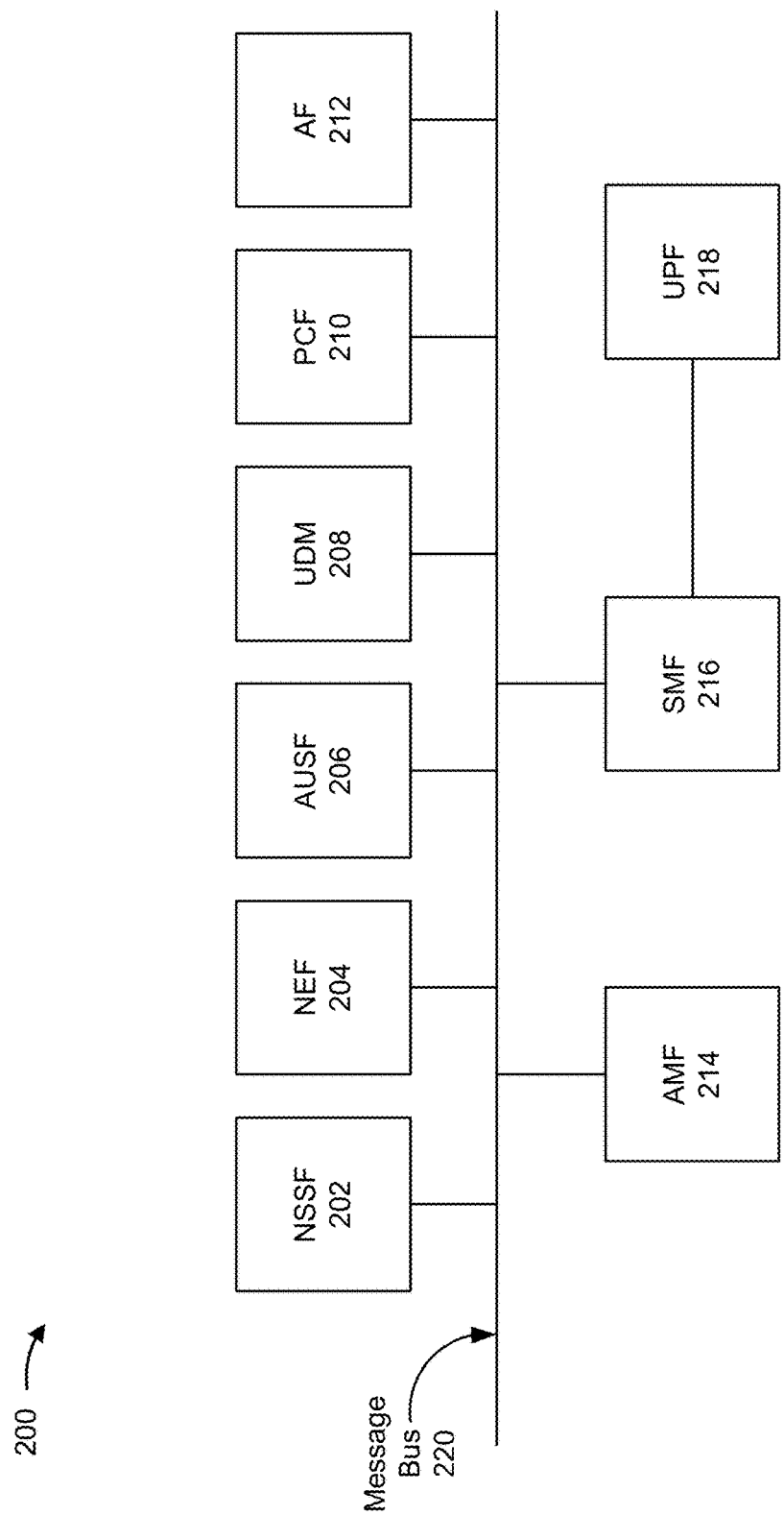
FIG. 2 is a diagram of an example functional architecture of an example core network described herein.

FIG. 2 is a diagram of an example functional architecture of a core network 200 in which systems and/or methods, described herein, can be implemented. For example, FIG. 2 can show an example architecture of a 5G NG core network included in a 5G wireless telecommunications system. In some implementations, the example architecture can be implemented by a core network (e.g., a core network described with respect to FIG. 3) and/or one or more of devices (e.g., a device described with respect to FIG. 4). While the example architecture of core network 200 shown in FIG. 2 can be an example of a service-based architecture, in some implementations, core network 200 can be implemented as a reference-point architecture.

As shown in FIG. 2, core network 200 can include a number of functional elements. The functional elements can include, for example, a Network Slice Selection Function (NSSF) 202, a Network Exposure Function (NEF) 204, an Authentication Server Function (AUSF) 206, a Unified Data Management (UDM) component 208, a PCF 210, an Application Function (AF) 212, an Access and Mobility Management Function (AMF) 214, a SMF 216, a UPF 218, and/or the like. These functional elements can be communicatively connected via a message bus 220. Each of the functional elements shown in FIG. 2 is implemented on one or more devices associated with a wireless telecommunications system. In some implementations, one or more of the functional elements can be implemented on physical devices, such as an access point, a base station, a gateway, and/or the like. In some implementations, one or more of the functional elements can be implemented on a computing device of a cloud computing environment.

NSSF 202 can select network slice instances for UE's. By providing network slicing, NSSF 202 allows an operator to deploy multiple substantially independent end-to-end networks potentially with the same infrastructure. In some implementations, each slice can be customized for different services. NEF 204 can support the exposure of capabilities and/or events in the wireless telecommunications system to help other entities in the wireless telecommunications system discover network services.

AUSF 206 can act as an authentication server and support the process of authenticating UEs in the wireless telecommunications system. UDM 208 can store subscriber data and profiles in the wireless telecommunications system. UDM 208 can be used for fixed access, mobile access, and/or the like, in core network 200. PCF 210 can provide a policy framework that incorporates network slicing, roaming, packet processing, mobility management, and/or the like.

AF 212 can support application influence on traffic routing, access to NEF 204, policy control, and/or the like. AMF 214 can act as a termination point for Non Access Stratum (NAS) signaling, mobility management, and/or the like. SMF 216 can support the establishment, modification, and release of communications sessions in the wireless telecommunications system. For example, SMF 216 can configure traffic steering policies at UPF 218, enforce UE IP address allocation and policies, and/or the like.

UPF 218 can serve as an anchor point for intra/interRadio Access Technology (RAT) mobility. UPF 218 can apply rules to packets, such as rules pertaining to packet routing, traffic reporting, handling user plane QoS, and/or the like. Message bus 220 represents a communication structure for communication among the functional elements. In other words, message bus 220 can permit communication between two or more functional elements.

The number and arrangement of functional elements shown in FIG. 2 are provided as an example. In practice, there can be additional functional elements, fewer functional elements, different functional elements, or differently arranged functional elements than those shown in FIG. 2. Furthermore, two or more functional elements shown in FIG. 2 can be implemented within a single device, or a single functional element shown in FIG. 2 can be implemented as multiple, distributed devices. Additionally, or alternatively, a set of functional elements (e.g., one or more functional elements) of core network 200 can perform one or more functions described as being performed by another set of functional elements of core network 200.

Figure 3:
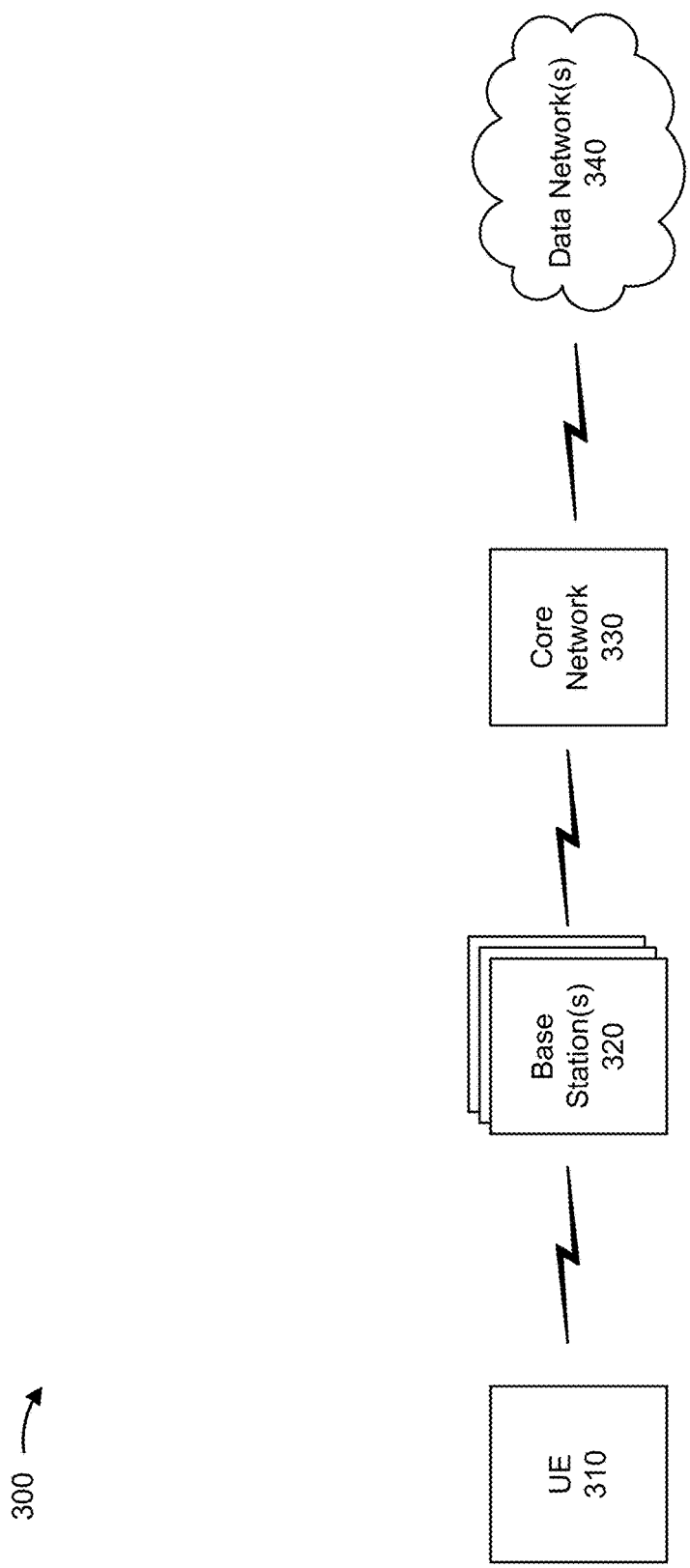
FIG. 3 is a diagram of an example environment in which systems, function architectures, and/or methods, described herein, can be implemented.

FIG. 3 is a diagram of an example environment 300 in which systems, functional elements, and/or methods, described herein, can be implemented. As shown in FIG. 3, environment 300 can include a UE 310, one or more base stations 320, a core network 330, and one or more data networks 340. Devices of environment 300 can interconnect via wired connections, wireless connections, or a combination of wired and wireless connections.

UE 310 can include one or more devices capable of communicating with base station 320 and/or data network 340 (e.g., via core network 330). For example, UE 310 can include a wireless communications device, a radiotelephone, a personal communications system (PCS) terminal (e.g., that can combine a cellular radiotelephone with data processing and data communications capabilities), a smart phone, a laptop computer, a tablet computer, a personal gaming system, a mobile hotspot device, a fixed wireless access device, a customer premises equipment, and/or a similar device. UE 310 can be capable of communicating using uplink (e.g., UE 310 to base station 320) communications, downlink (e.g., base station 320 to UE 310) communications, and/or sidelink (e.g., UE-to-UE) communications. In some implementations, UE 310 can include a machine-type communication (MTC) UE, such as an evolved or enhanced MTC (eMTC) UE. In some implementations, UE 310 can include an Internet of Things (IoT) UE, such as a narrowband IoT (NB-IoT) UE and/or the like. In some implementations, UE 310 can be capable of communicating using multiple RATs.

Base station 320 can include one or more devices capable of communicating with UE 310 using a cellular RAT. For example, base station 320 can include a base transceiver station, a radio base station, a node B, an eNB, a gNB, a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. Base station 320 can transfer traffic between UE 310 (e.g., using a cellular RAT), other base stations 320 (e.g., using a wireless interface or a backhaul interface, such as a wired backhaul interface), and/or core network 330. Base station 320 can provide one or more cells that cover geographic areas. Some base stations 320 can be mobile base stations. Some base stations 320 can be capable of communicating using multiple RATs.

In some implementations, base station 320 can perform scheduling and/or resource management for UEs 310 covered by base station 320 (e.g., UEs 310 covered by a cell provided by base station 320). In some implementations, base stations 320 can be controlled or coordinated by a network controller, which can perform load balancing, network-level configuration, and/or the like. The network controller can communicate with base stations 320 via a wireless or wireline backhaul. In some implementations, base station 320 can include a network controller, a self-organizing network (SON) module or component, or a similar module or component. In other words, a base station 320 can perform network control, scheduling, and/or network management functions (e.g., for other base stations 320 and/or for uplink, downlink, and/or sidelink communications of UEs 310 covered by the base station 320). In some implementations, base station 320 can include a central unit and multiple distributed units. The central unit can coordinate access control and communication with regard to the multiple distributed units. The multiple distributed units can provide UEs 310 and/or other base stations 320 with access to data network 340 via core network 330.

Core network 330 can include various types of core network architectures, such as a 5G NG Core (e.g., core network 200 of FIG. 2), a LTE EPC, and/or the like. In some implementations, core network 330 can be implemented on physical devices, such as a gateway, a mobility management entity, and/or the like. In some implementations, the hardware and/or software implementing core network 330 can be virtualized (e.g., through the use of network function virtualization and/or software-defined networking), thereby allowing for the use of composable infrastructure when implementing core network 330. In this way, networking, storage, and compute resources can be allocated to implement the functions of core network 330 (described in FIG. 2) in a flexible manner as opposed to relying on dedicated hardware and software to implement these functions.

Data network 340 can include one or more wired and/or wireless data networks. For example, data network 340 can include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 3 are provided as an example. In practice, there can be additional devices and/or networks, fewer devices and/or networks, different devices and/or networks, or differently arranged devices and/or networks than those shown in FIG. 3. Furthermore, two or more devices shown in FIG. 3 can be implemented within a single device, or a single device shown in FIG. 3 can be implemented as multiple, distributed devices. Additionally, or alternatively, a set of devices (e.g., one or more devices) of environment 300 can perform one or more functions described as being performed by another set of devices of environment 300.

Figure 4:
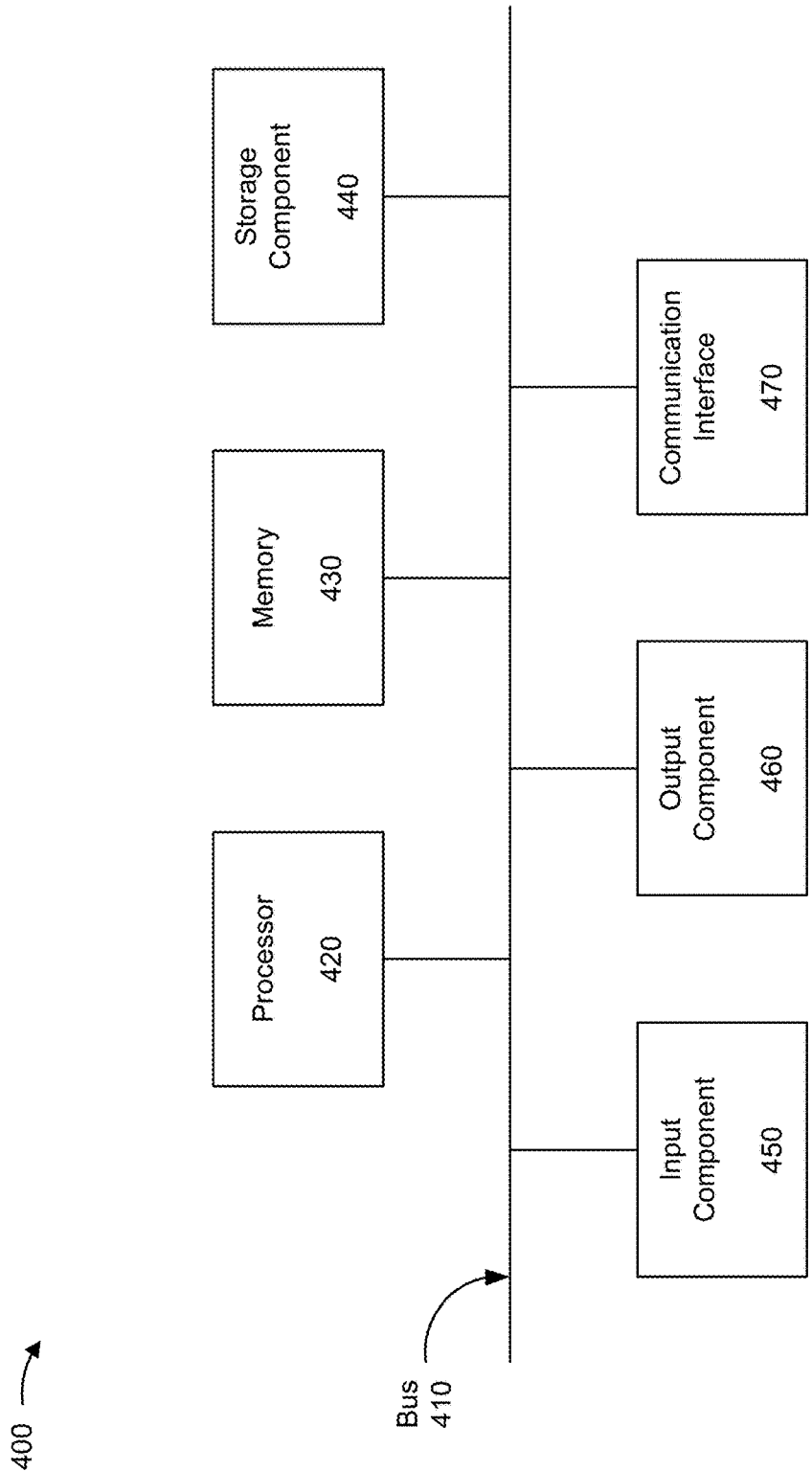
FIG. 4 is a diagram of example components of one or more devices of FIGS. 2 and 3.

FIG. 4 is a diagram of example components of a device 400. Device 400 can correspond to, or can implement, one or more functional elements of core network 200, UE 310, base station 320, one or more functional elements or devices of core network 330, and/or data network 340. In some implementations, one or more functional elements of core network 200, UE 310, base station 320, one or more functional elements or devices of core network 330, and/or data network 340 can include one or more devices 400 and/or one or more components of device 400. As shown in FIG. 4, device 400 can include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 can include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 can permit device 400 to receive information from another device and/or provide information to another device. For example, communication interface 470 can include an Ethernet interface, an optical interface, a coaxial interface, an infrared interface, a radio frequency (RF) interface, a universal serial bus (USB) interface, a wireless local area network interface, a cellular network interface, and/or the like.

Device 400 can perform one or more processes described herein. Device 400 can perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions can be read into memory 430 and/or storage component 440 from another computer-readable medium or from another device via communication interface 470. When executed, software instructions stored in memory 430 and/or storage component 440 can cause processor 420 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 can include additional components, fewer components, different components, or differently arranged components than those shown in FIG. 4. Additionally, or alternatively, a set of components (e.g., one or more components) of device 400 can perform one or more functions described as being performed by another set of components of device 400.

FIG. 5 is a flow chart of an example process 500 for a programmable user plane function. In some implementations, one or more process blocks of FIG. 5 can be performed by a UPF component, which can be included in a core network (e.g., core network 200, core network 330, and/or the like) of a wireless telecommunications system. In some implementations, one or more process blocks of FIG. 5 can be performed by another device or a group of devices separate from or including the UPF component, such as other components in core network 330, UE 310, base station(s) 320, data network 340, and/or the like.

As shown in FIG. 5, process 500 can include receiving, at a UPF component, a set of rules for managing a communications session (block 510). For example, the UPF component (e.g., using processor 420, memory 430, storage component 440, communication interface 470, and/or the like) can receive a set of rules for managing a communications session, as described above in connection with FIGS. 1A-1C. In some implementations, the set of rules can include a set of mobility management rules and a set of packet processing rules.

As further shown in FIG. 5, process 500 can include, based on receiving the set of rules at the UPF component, storing the set of mobility management rules at the UPF component, and storing the set of packet processing rules at a user plane of the UPF component (block 520). For example, the UPF component (e.g., using processor 420, memory 430, storage component 440, and/or the like) can, based on receiving the set of rules, store the set of mobility management rules at the UPF component, and store the set of packet processing rules at a user plane of the UPF component, as described above in connection with FIGS. 1A-1C.

As further shown in FIG. 5, process 500 can include performing, at a control plane of the UPF component, an analysis of a flow of one or more packets transmitted by a UE during the communications session (block 530). For example, the UPF component (e.g., using processor 420, memory 430, storage component 440, and/or the like) can perform, at a control plane of the UPF component, an analysis of a flow of one or more packets transmitted by a UE during the communications session, as described above in connection with FIGS. 1A-1C.

As further shown in FIG. 5, process 500 can include generating, at run-time and based on the analysis of the flow of the one or more packets, a modified set of packet processing rules from the stored set of packet processing rules (block 540). For example, the UPF component (e.g., using processor 420, memory 430, storage component 440, and/or the like) can generate, at run-time and based on the analysis of the flow of the one or more packets, a modified set of packet processing rules from the stored set of packet processing rules, as described above in connection with FIGS. 1A-1C.

As further shown in FIG. 5, process 500 can include storing the modified set of packet processing rules at the user plane of the UPF component (block 550). For example, the UPF component (e.g., using processor 420, memory 430, storage component 440, and/or the like) can store the modified set of packet processing rules at the user plane of the UPF component, as described above in connection with FIGS. 1A-1C.

As further shown in FIG. 5, process 500 can include receiving, at the UPF component, a packet of the flow of the one or more packets (block 560). For example, the UPF component (e.g., using processor 420, memory 430, storage component 440, input component 450, output component 460, communication interface 470, and/or the like) can receive a packet of the flow of the one or more packets, as described above in connection with FIGS. 1A-1C.

As further shown in FIG. 5, process 500 can include applying the modified set of packet processing rules to the received packet (block 570). For example, the UPF component (e.g., using processor 420, memory 430, storage component 440, and/or the like) can apply the modified set of packet processing rules to the received packet, as described above in connection with FIGS. 1A-1C.

As further shown in FIG. 5, process 500 can include forwarding the received packet after applying the modified set of packet processing rules to the received packet and updating the modified set of packet processing rules (block 580). For example, the UPF component (e.g., using processor 420, memory 430, storage component 440, input component 450, output component 460, communication interface 470, and/or the like) can forward the received packet after applying the modified set of packet processing rules to the received packet, as described above in connection with FIGS. 1A-1C.

Process 500 can include additional implementations, such as any single implementation or any combination of implementations described below and/or described with regard to any other process described herein.

In some implementations, receiving the set of rules can include receiving the set of rules at the UPF component from a PCF component via a SMF component. In some implementations, the stored set of packet processing rules can include at least one of a forwarding action rule, a usage reporting rule, a packet detection rule, or a QoS enforcement rule.

In some implementations, generating the modified set of packet processing rules can include generating the modified set of packet processing rules from the stored set of packet processing rules based on one or more properties of the flow of the one or more packets. In some implementations, the one or more properties of the flow of the one or more packets can identify at least one of a type of application associated with the flow, a type of service associated with the flow, a source address associated with the flow, a destination address associated with the flow, a source port associated with the flow, a destination port associated with the flow, a protocol associated with the flow, or a type of API associated with the flow.

In some implementations, the modified set of packet processing rules can define at least one of routing or forwarding of the received packet, packet classification of the received packet, QoS handling of the received packet, packet inspection of the received packet, packet marking of the received packet, a modification to the packet marking of the received packet, a modification to a header of the received packet, packet buffering of the received packet, redirection of the received packet, traffic steering of the received packet, or traffic usage reporting of the received packet.

In some implementations, the UPF component can also apply the stored set of mobility management rules to the received packet.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

Some implementations, described herein, provide a wireless telecommunications system architecture capable of dynamically processing packets through the use of UPF programming. In some implementations, the wireless telecommunications system can include a core network that includes a UPF having a control plane and a user plane. The UPF can receive, at the UPF, a set of rules for managing a communications session. The received set of rules can include a set of mobility management rules and a set of packet processing rules. The UPF can store the set of mobility management rules at the UPF and store the set of packet processing rules at the user plane. The UPF can perform, at the control plane of the UPF, an analysis of a flow of one or more packets transmitted during the communications session. The UPF can generate, at run-time and based on the analysis of the flow, a modified set of packet processing rules from the stored set of packet processing rules, and store the modified set of packet processing rules at the user plane. In this way, the UPF can receive, at the UPF, a packet of the flow of the one or more packets, apply the modified set of packet processing rules to the received packet, and forward the received packet after applying the modified set of packet processing rules to the received packet. This allows the network operator to make rule changes at run-time (e.g., at the start of a communications session, mid-session of a communications session, any time within a communications session, and/or the like) as opposed to making rule changes in a software update to the core network between communications sessions and/or during network maintenance. Moreover, making modifications at run-time allows the UPF to apply sets of packet processing rules tailored to specific types of packets, which can result in lower network latency, more efficient packet routing, increased network reliability, increased quality of service, faster encryption and decryption of packets, and the like.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, and/or the like), and can be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method, comprising:
   storing, by a user plane function (UPF) component, a set of packet processing rules,
      wherein the set of packet processing rules include at least one of:
         a forwarding action rule that controls packet forwarding,
         a usage reporting rule that controls statistic collection regarding forwarded packets, or
         a packet detection rule that controls packet detection;
   performing, by the user plane function (UPF) component, an analysis of a flow of one or more packets transmitted during a communication session to determine one or more properties associated with the flow;
   generating, by the UPF component, during the communication session, and based on the analysis, a modified set of packet processing rules by at least one of:
      adding a rule to the set of packet processing rules,
      eliminating a rule from the set of packet processing rules, or
      changing a rule in the set of packet processing rules,
      wherein the modified set of packet processing rules are tailored to the flow based on the one or more properties;
   receiving, by the UPF component, a packet of the flow;
   applying, by the UPF component and at run-time, the modified set of packet processing rules to the packet; and
   forwarding, by the UPF component and based on applying the modified set of packet processing rules to the packet, the packet.

2. The method of claim 1, wherein performing the analysis comprises:
   analyzing the one or more properties,
      wherein the one or more properties include at least one of:
         an address,
         a port identifier,
         a protocol identifier,
         a type of application,
         a type of service, or
         a type of application programming interface (API).

3. The method of claim 1, wherein applying the modified set of packet processing rules to the packet comprises one or more of:
   adding information to a header of the packet;
   removing information from the header of the packet; or
   changing information in the header of the packet.

4. The method of claim 1, wherein the modified set of packet processing rules define one or more of:
   routing or forwarding of a received packet;
   packet inspection of a received packet;
   a modification to a header of a received packet;
   packet buffering of a received packet;
   redirection of a received packet;
   traffic steering of a received packet; or
   traffic usage reporting associated with a received packet.

5. A user plane function (UPF) component, comprising:
   one or more processors configured to:
      store a set of packet processing rules,
         wherein the set of packet processing rules include at least one of:
            a forwarding action rule that controls packet forwarding,
            a usage reporting rule that controls statistic collection regarding forwarded packets, or
            a packet detection rule that controls packet detection;
      perform an analysis of a flow of one or more packets transmitted during a communication session to determine one or more properties associated with the flow;

generate, during the communication session and based on the analysis, a modified set of packet processing rules by at least one of:
adding a rule to the set of packet processing rules,
eliminating a rule from the set of packet processing rules, or
changing a rule in the set of packet processing rules,
wherein the modified set of packet processing rules are tailored to the flow based on the one or more properties;
receive a packet of the flow;
apply, at run-time, the modified set of packet processing rules to the packet; and
forward, based on applying the modified set of packet processing rules to the packet, the packet.

6. The UPF component of claim 5, wherein the one or more processors, to perform the analysis, are configured to:
analyze the one or more properties,
wherein the one or more properties include one or more of:
an address,
a port identifier,
a protocol identifier,
a type of application,
a type of service, or
a type of application programming interface (API).

7. The UPF component of claim 5, wherein the one or more processors, to apply the modified set of packet processing rules to the packet, are configured to one or more of:
add information to a header of the packet;
remove information from the header of the packet; or
change information in the header of the packet.

8. The UPF component of claim 5, wherein the modified set of packet processing rules define one or more of:
routing or forwarding of a received packet;
packet inspection of a received packet;
a modification to a header of a received packet;
packet buffering of a received packet;
redirection of a received packet;
traffic steering of a received packet; or
traffic usage reporting associated with a received packet.

9. A non-transitory computer-readable medium storing instructions, the instructions comprising:
one or more instructions that, when executed by one or more processors of a device, cause the device to:
store a set of packet processing rules,
wherein the set of packet processing rules include at least one of:
a forwarding action rule that controls packet forwarding,
a usage reporting rule that controls statistic collection regarding forwarded packets, or
a packet detection rule that controls packet detection;
perform an analysis of a flow of one or more packets transmitted during a communication session to determine one or more properties associated with the flow;
generate, during the communication session and based on the analysis, a modified set of packet processing rules by at least one of:
adding a rule to the set of packet processing rules,
eliminating a rule from the set of packet processing rules, or
changing a rule in the set of packet processing rules,
wherein the modified set of packet processing rules are tailored to the flow based on the one or more properties;
receive a packet of the flow;
apply, at run-time, the modified set of packet processing rules to the packet; and
forward, based on applying the modified set of packet processing rules to the packet, the packet.

10. The non-transitory computer-readable medium of claim 9, wherein the one or more instructions, that cause the device to perform the analysis, cause the device to:
analyze the one or more properties,
wherein the one or more properties include at least one of:
an address,
a port identifier,
a protocol identifier,
a type of application,
a type of service, or
a type of application programming interface (API).

11. The non-transitory computer-readable medium of claim 9, wherein the one or more instructions, that cause the device to apply the modified set of packet processing rules to the packet, cause the device to one or more of:
add information to a header of the packet;
remove information from the header of the packet; or
change information in the header of the packet.

12. The non-transitory computer-readable medium of claim 9, wherein the modified set of packet processing rules define one or more of:
routing or forwarding of a received packet;
packet inspection of a received packet;
a modification to a header of a received packet;
packet buffering of a received packet;
redirection of a received packet;
traffic steering of a received packet; or
traffic usage reporting associated with a received packet.

13. The method of claim 1, wherein the set of packet processing rules include at least one of:
the usage reporting rule, or
the packet detection rule.

14. The method of claim 1, further comprising:
receiving a set of rules,
wherein the set of rules include a set of mobility management rules and the set of packet processing rules; and
storing the set of mobility management rules.

15. The method of claim 14, wherein the set of mobility management rules include at least one of:
a service continuity rule, or
a session continuity rule.

16. The UPF component of claim 5, wherein the set of packet processing rules include at least one of:
the usage reporting rule, or
the packet detection rule.

17. The UPF component of claim 5, wherein the one or more processors are further configured to:
receive a set of rules,
wherein the set of rules include a set of mobility management rules and the set of packet processing rules; and
store the set of mobility management rules.

18. The UPF component of claim 17, wherein the set of mobility management rules include at least one of:
a service continuity rule, or
a session continuity rule.

19. The non-transitory computer-readable medium of claim 9, wherein the set of packet processing rules include at least one of:
the usage reporting rule, or
the packet detection rule.

20. The non-transitory computer-readable medium of claim 9, wherein the one or more instructions, when executed by the one or more processors of the device, further cause the device to:
receive a set of rules,
wherein the set of rules include a set of mobility management rules and the set of packet processing rules; and
store the set of mobility management rules.

* * * * *